Jan. 6, 1942.  A. C. HUCKELBRIDGE  2,268,707
BRANDING CHUTE
Filed March 21, 1941  5 Sheets-Sheet 1

A.C. Huckelbridge,
INVENTOR.
BY
ATTORNEYS.

Jan. 6, 1942.   A. C. HUCKELBRIDGE   2,268,707
BRANDING CHUTE
Filed March 21, 1941   5 Sheets-Sheet 5
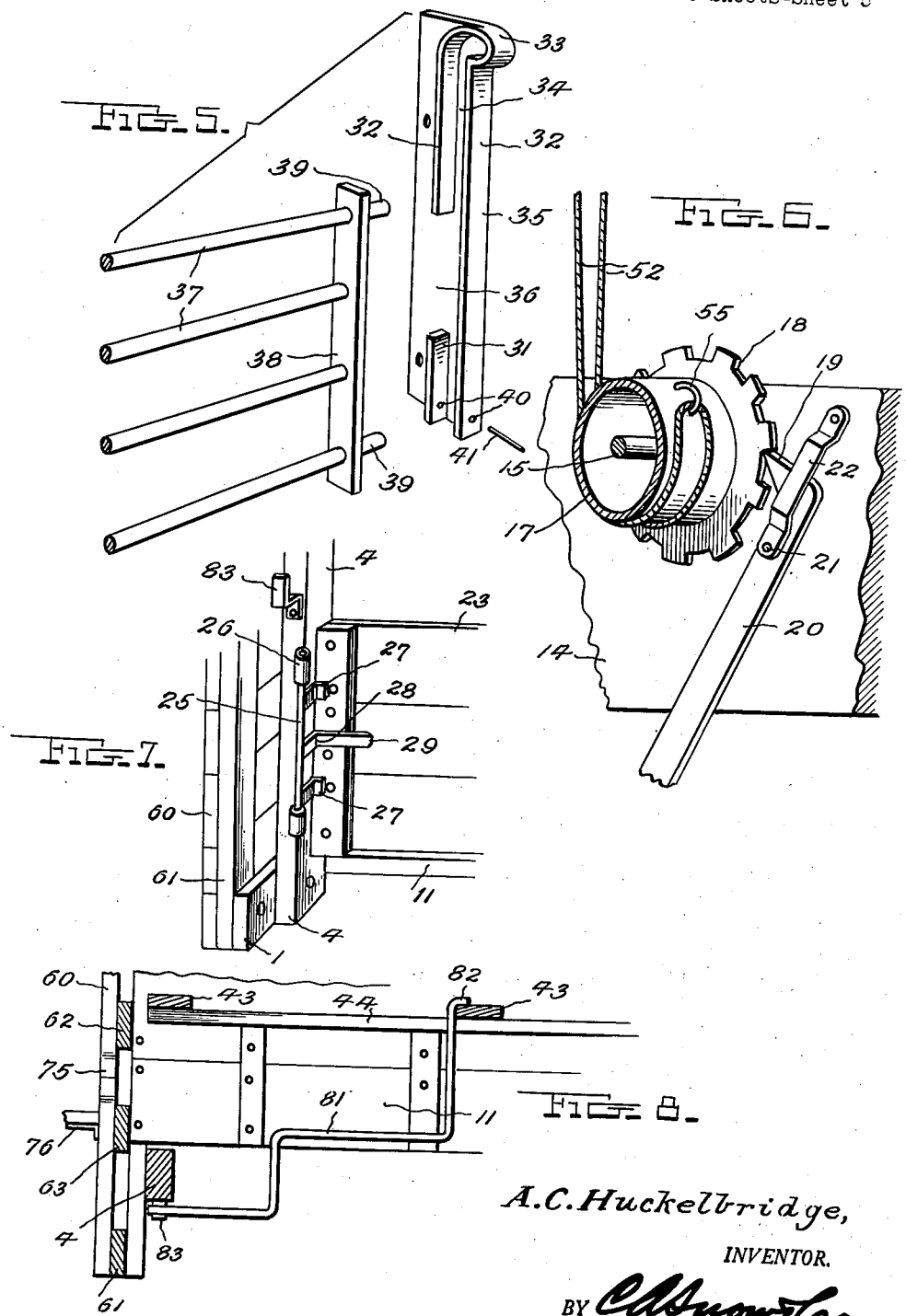
A.C. Huckelbridge,
INVENTOR.
BY *[signature]*
ATTORNEYS.

Patented Jan. 6, 1942

2,268,707

UNITED STATES PATENT OFFICE 2,268,707

BRANDING CHUTE

Arthur C. Huckelbridge, Coldwater, Kans.

Application March 21, 1941, Serial No. 384,558

2 Claims. (Cl. 119—99)

This invention relates to a chute designed for holding cattle while being branded and dehorned, one of the objects being to provide the chute with a squeeze having means whereby it is normally held open but can be readily actuated by the user for the purpose of holding an animal firmly in position while being either branded or dehorned.

A further object is to provide the chute with an adjustably mounted grid which can be securely held in place for the purpose of confining the animal while being positioned in the chute, said grid being readily shiftable to facilitate branding.

A still further object is to provide the chute with a stanchion with which is associated an adjustable means for holding the head of the animal in a lowered position for dehorning, said holding means being adjustable to animals of different sizes.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings—

Figure 5 is a perspective view showing portions of the grid and its holder.

Figure 6 is a perspective view of a portion of the squeeze-operating mechanism.

Figure 7 is a perspective view showing a means for holding the side door in closed position.

Figure 8 is a horizontal section through one end portion of the chute on a reduced scale showing a supplemental tool for use in connection therewith.

Figure 1:
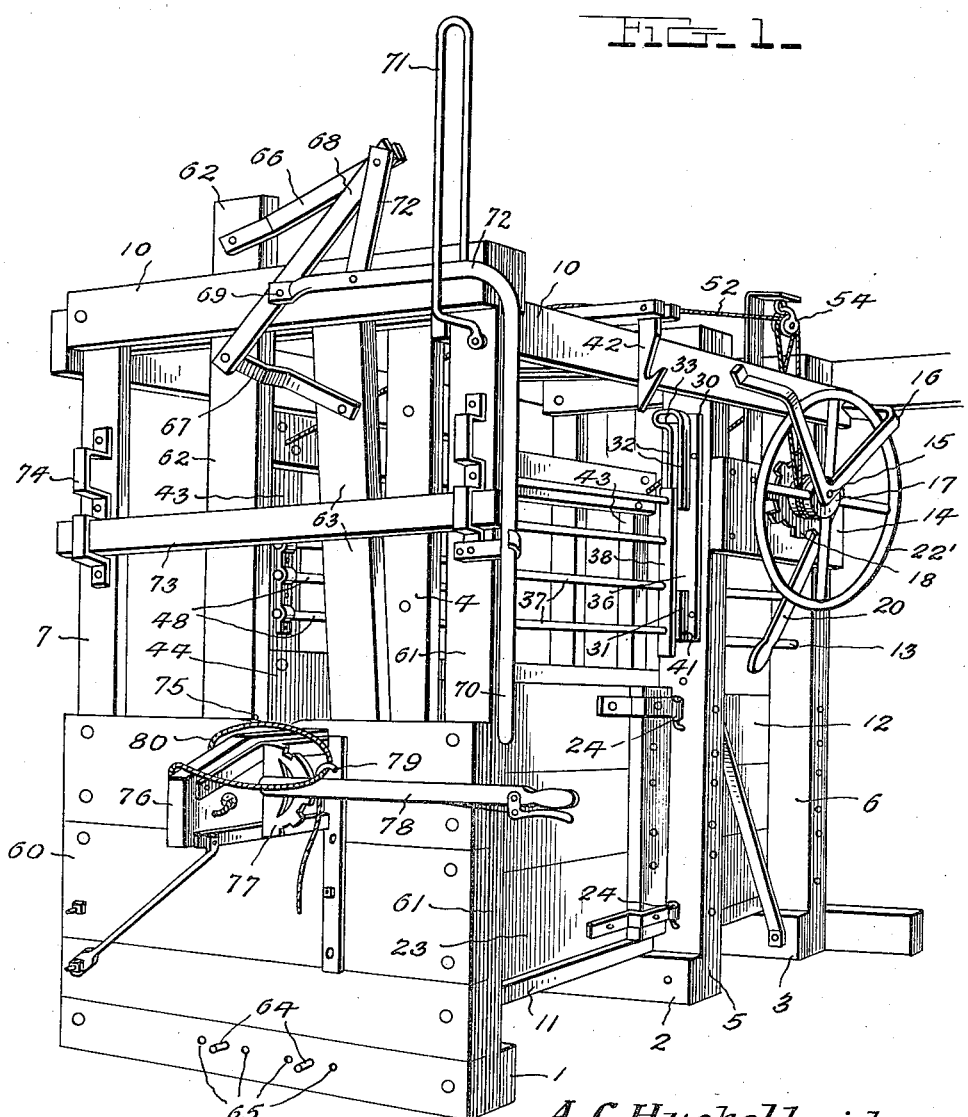
Figure 1 is a perspective view showing one end portion of the chute, the same being closed at the sides preparatory to receiving an animal.

Referring to the figures by characters of reference, 1, 2 and 3 constitute floor sills on which are erected standards 4, 5 and 6 located at one side of the chute and additional standards 7, 8 and 9 at the other side of the chute. The standards at the two sides serve to support a top frame 10 made up of suitably connected and reenforced beams.

A floor 11 is secured on the sills 1, 2 and 3 and upstanding from one side thereof is a wall 12 secured to the standards 5 and 6 but leaving a door opening between the standards 4 and 5. Wall 12 does not extend throughout the height of the chute but it is preferably about two and a half or three feet high so that when an animal is located in the chute the upper rear portion of the body will be exposed above the wall. Bars 13 are seated at their ends in the standards 5 and 6 and are disposed in parallel relation to each other above the wall so as to constitute retaining means. These standards 5 and 6 are also connected by a strip 14 providing a support for one end of a shaft 15 the other end of which is supported by a depending bracket 16 attached to the top structure 10 and extended laterally therefrom.

A drum 17 is mounted for rotation on shaft 15 and has a toothed flange 18 at one end thereof adapted to be engaged by a dog 19 extending from one end of a lever 20 which is fulcrumed at 21 on the strip 14. This dog can be properly guided by a bracket 22 which overlies the dog and is attached to the pivot member 21 and also to the strip 14 as shown in Figure 6.

An operating wheel 22' is joined to the drum at one end thereof, as shown in Figure 1, and by means thereof said drum can be rotated in one direction so as to cause the teeth 18 to slip past the dog 19. The weight of the lever 20, however, serves to hold the dog in engagement with a tooth when there is a tendency of the drum to rotate in the opposite direction and the dog can be disengaged solely by shifting the lever 20 forcibly away from the position shown in Figure 6.

A side door 23 is hingedly connected at 24 to the standard 5 and serves to bridge the space between the standards 4 and 5. This door preferably extends the same height as the wall 12 and it can be held in closed position in any suitable manner. For example a rotatable rod 25 can be mounted in bearings 26 located on beam 4 outside of the path of the door and extending from this rod are superposed parallel angular fingers 27 and 28 so proportioned that when the door is closed, the fingers can be swung thereagainst so as to hold it and to transmit thrust along a dead center from the door to the rod 25. Finger 28 can have an elongated portion 29 forming a handle whereby the rod can be rotated readily for the purpose of swinging all of the fingers away from and out of the path of the door when it is desired to swing the door outwardly to open position.

Secured to the standards 4 and 5 above the ends of the closed door are elongated holding strips 30 each of which is provided, near its lower end, with a stop flange 31. Two flanges on the two strips are extended toward each other and are located below guide tracks made up of parallel flanges 32 spaced apart at their lower ends but offset inwardly and merging at their upper ends as shown at 33 so that a channel is thus formed between the flanges which extends straight up for the greater distance of the track and then curves backwardly as shown particularly in Figures 1 and 5. This channel is indicated generally at 34. It will be noted that the back or inner flange 32 has an extension 35 which projects downwardly and extends back of the flange 31. As flange 31 is spaced from the corresponding flange 32 thereabove, a clearance 36 is thus provided.

Removably and adjustably mounted between the uprights or standards 4 and 5 is a grid made up of superposed parallel rods 37 connected near their ends by strips 38. The upper and lower rods have terminals 39 projecting beyond the strips 38. This grid is so proportioned that it can be inserted between the opposed sets of flanges 32. This is done by lowering the grid until the upper projecting portions 39 are back of and opposite to the clearances 36 whereupon the lower projecting ends 39 are brought to position below the flange 31 and the extension 35. The grid is then thrust upwardly, moving these projecting ends into engagement with the flanges, the upper ends 39 moving into the channels 34 while the lower ends 39 move between flanges 31 and extensions 35. After the grid has been placed in position it can be held against downward withdrawal in any suitable manner. One such means would be to extend a pin or bolt under the lower projecting ends 39 where it is seated in openings 40 in flanges 31 and extensions 35. The end of such a pin has been indicated at 41 in Figure 1.

Figure 3:
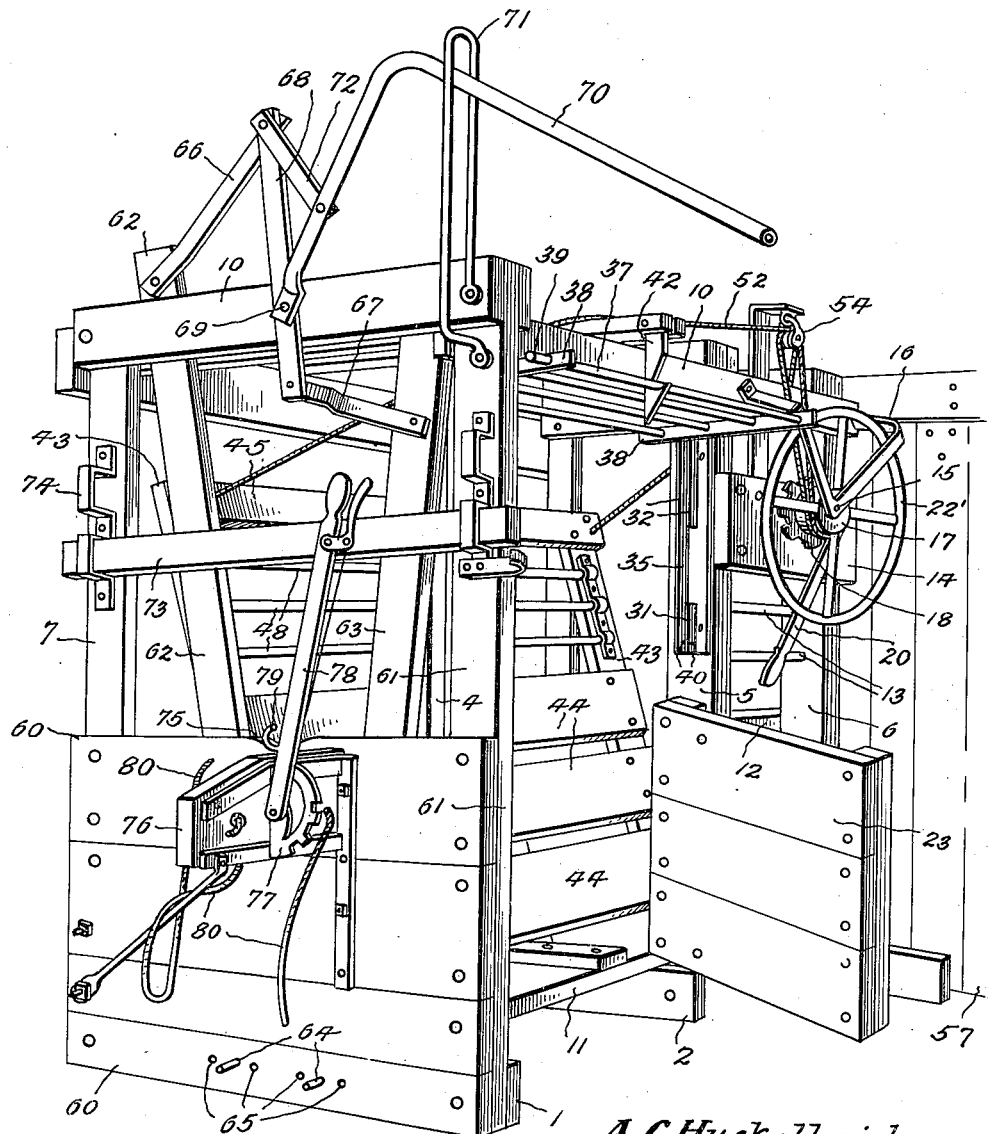
Figure 3 is a view similar to Figure 1 showing the side door and the grid both in open position.

Obviously with the grid in its normal position as shown in Figure 1 it will serve to restrain an animal so that it cannot jump out of position and throw a leg over the closed gate 23. When it is desired to obtain access to the animal for the purpose of branding it, this grid can be pushed upwardly until the upper projecting ends 39 move into the offset upper ends of the channel 34. This will bring the lower projecting ends 39 opposite the clearances 36 so that the grid thus can be swung upwardly and outwardly into engagement with a supporting hook 42 suspended from the top structure as shown particularly in Figure 3.

Extending upwardly from that side portion of the floor 11 remote from the door 23 is a squeeze made up of parallel end and intermediate strips 43 the bottom portions of which are connected by superposed strips 44 while the upper ends are connected by a top strip 45. Hinge members 46 extend downwardly from the end strips 43 and are hingedly connected to the sills 1 and 3. These hinge members, in the structure illustrated, are extended through slots 47 in the floor so that the squeeze thus is free to swing toward or from the opposed wall of the chute. That portion of the squeeze between the strips 44 and 45 can be closed in part by superposed parallel rods 48.

Figure 4:
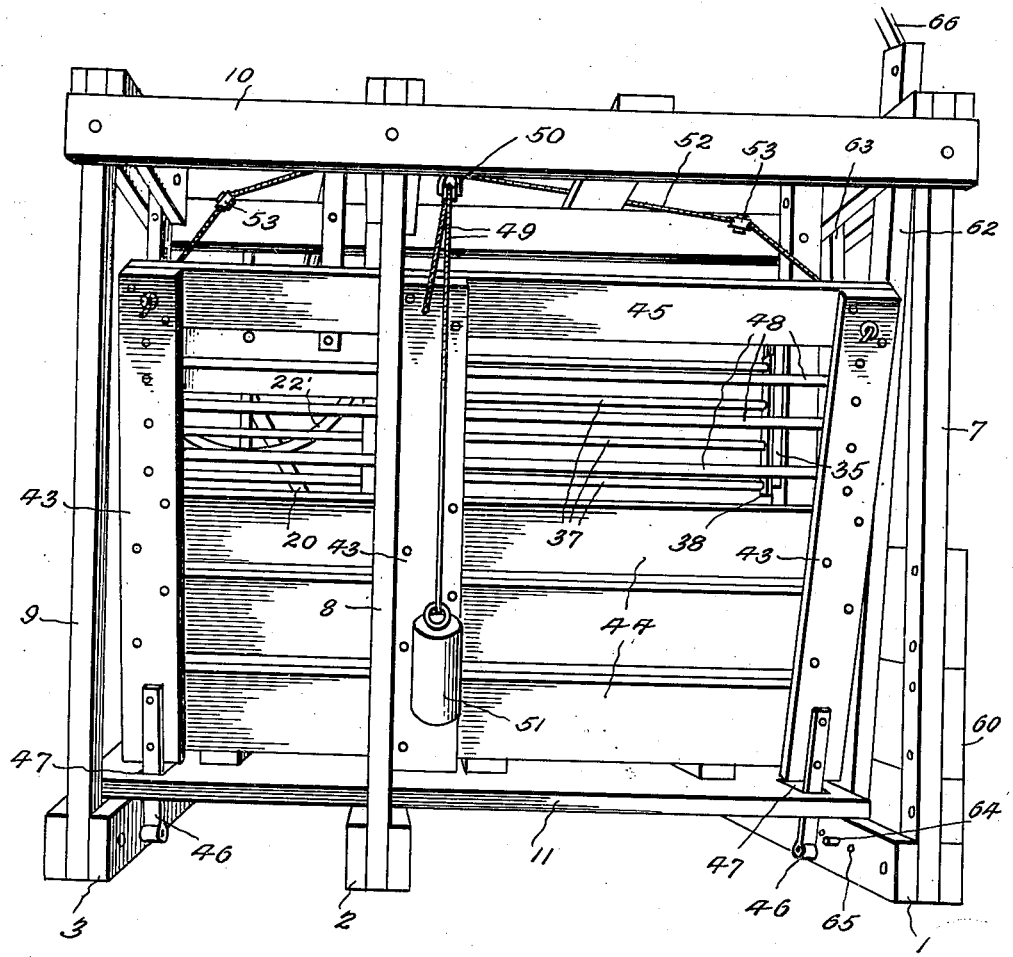
Figure 4 is a perspective view showing that side of the chute opposite to the side shown in Figure 3.

A rope 49 is connected to the upper portion of the squeeze and is extended laterally therefrom over a guide pulley 50 supported by the top structure 10, from which it extends downwardly to a weight 51. This weight serves to hold the squeeze normally swung laterally away from the opposed wall as shown particularly in Figures 2, 3 and 4.

A rope 52 has its terminals secured to the corner portions of the squeeze at the top thereof and is guided across the top portion of the chute by pulleys 53 which are secured to the top structure 10 adjacent to the upper ends of the standards 4 and 6. From these pulleys the rope is guided over another pulley 54 and thence downwardly to the drum 17 to which it is attached in any suitable manner, as by means of a loop 55.

The door 23 and wall 12 cooperate with the squeeze to form a chute properly proportioned to receive the animal to be handled. A door opening 56 is provided at one end of the structure and is adapted to be closed by a suspended sliding door 57 the hangers 58 of which are mounted on a rod 59 constituting a track. Thus after an animal is admitted to the chute through the door opening 56 shown in Figure 2, the door 57 can be closed, thereby preventing the animal from backing out of position.

At the other end of the chute there is a wall 60 connecting standard 7 to a supplemental standard 61 located adjacent to but offset from the standard 4. The bars 62 and 63 of a stanchion are pivotally connected at their lower ends to the sill 1 by means of pins 64, it being understood that these pins can be inserted in different openings 65 so as to adjust the lower ends of the stanchion bars toward or from each other. The upper ends of the stanchion bars are pivotally connected to links 66 and 67 which in turn are pivotally connected to the respective ends of a lever 68 which is fulcrumed between its ends on the top structure 10 as shown at 69. An operating lever 70 is also pivotally mounted at 69 and adapted to swing independently of lever 68. This operating lever can be mounted within a guide loop 71 and is connected by a link 72 to the upper end of lever 68. Thus when the operating lever 70 is pulled downwardly the link 72 will pull on lever 68 and cause motion to be transmitted through the links 66 and 67 to the stanchion bars 62 and 63 so that they will be swung toward each other and thus tightly grip the head of the animal which, at this time, is projecting over and beyond the wall 60. For the purpose of preventing the animal from raising its head, a cross-bar 73 is adjustably connected to the standards 7 and 61, there being angular straps 74 attached to said standards into which the bar can be inserted at different elevations so as to be adapted to animals of different heights.

The wall 60 is recessed at 75 to receive the neck of the animal and adjacent to this recess there is a projecting rest 76 having a laterally extended toothed segment 77 to which is pivotally attached a gripping lever 78. This lever carries a hook 79 or the like for engaging one end of a rope 80 the other end of which is anchored to the rest 76. This rope is adapted to be drawn around the neck of the animal and attached to the hook 79 whereupon, by swinging lever 78 laterally, the rope will draw tightly about the neck while the animal is being dehorned.

In practice the squeeze is in its normal or laterally extended position. Door 23 is closed and secured and the door 57 is opened. The animal to be branded and/or dehorned is driven into the open end of the chute and door 57 is closed. The bars above door 23 and wall 12 and the bars carried by the upper portion of the squeeze, prevent the animal from getting a leg over either the wall or the squeeze should it rear. The neck of the animal will naturally assume a position between the bars of the stanchion. Bar 73 is placed in position thereover and the stanchion bars drawn together. While in this position the neck of the animal can be gripped and secured by rope 80 and lever 78 and the animal dehorned. It is first necessary, however, to rotate wheel 22' so as to pull the squeeze toward the opposite side of the chute, thereby gripping the body of the animal firmly during the dehorning operation. When it is desired to brand the animal the grid is moved from the position shown in Figure 1 to the raised position shown in Figure 3 but the door 23 is kept shut. Thus the grid will offer no obstruction to the use of the branding iron.

Figure 2:
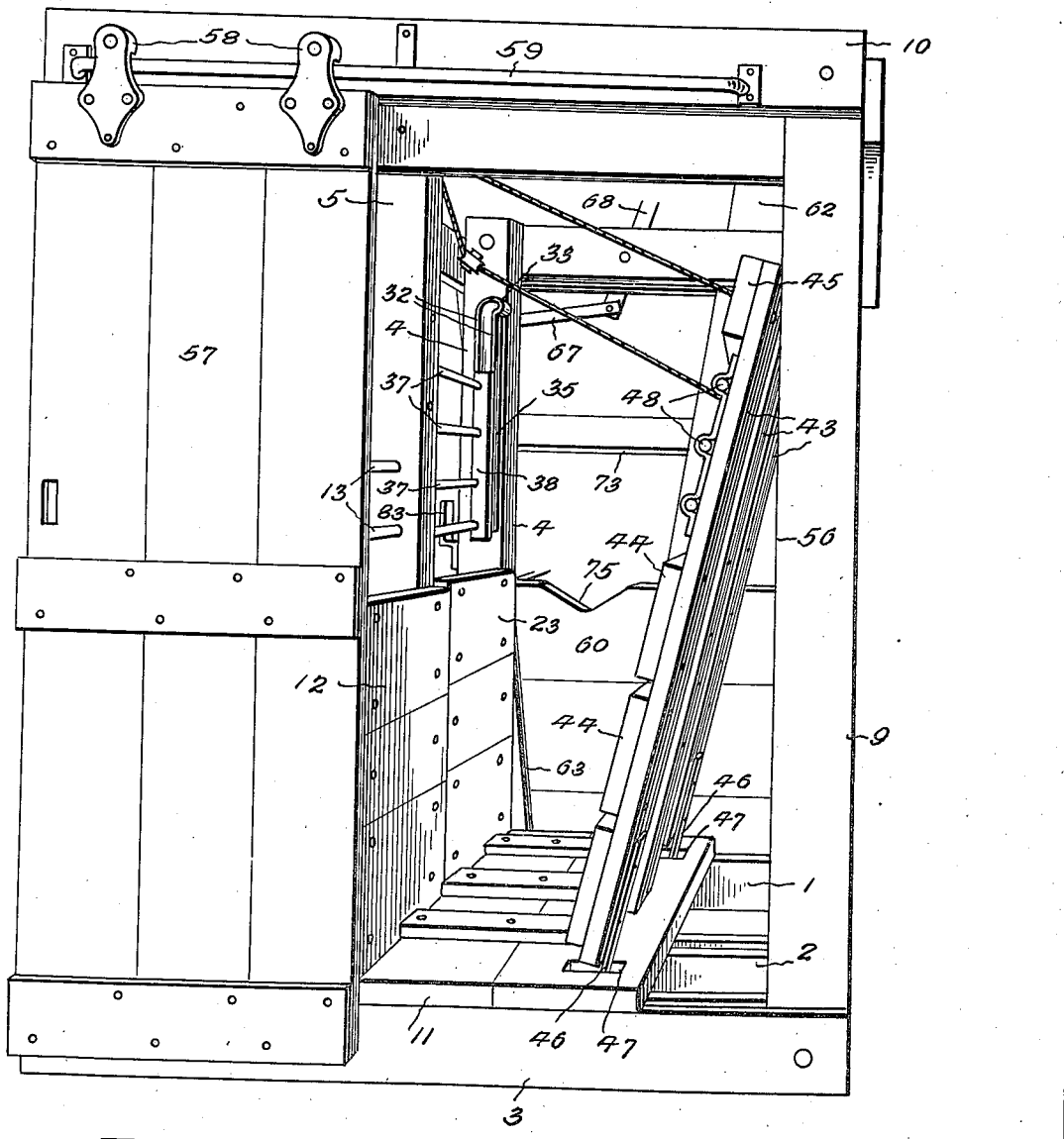
Figure 2 is a perspective view showing the opposite end of the chute, the entrance door being open and some of the parts being removed.

At other times, as during a castrating operation, an angular bar such as shown at 81 in Figure 8, can be inserted through the door opening while door 23 is open, one end of the bar being indicated at 82 being hooked back of one of the strips 43 of the squeeze while the other end, projecting through the door opening, can be dropped in engagement with a keeper 83 on standard 4 as shown in Figures 2 and 8. Obviously with the use of this bar the animal can be held under proper restraint even though the door 23 is open.

Obviously the animal after being operated on can be released readily by loosening the noose formed by rope 80, removing restraining bar 73, and shifting lever 20 so as to disengage the dog from the toothed flange of the drum so that the drum and wheel 22' thus can be rotated to pay out rope 52 and allow the squeeze to swing laterally under the action of its weight 51.

The structure herein described has been found very advantageous for use as a means for quickly and properly operating on livestock and it is also desirable because of the simplicity of its construction and its comparatively small size.

What is claimed is:

1. A branding chute including a floor with a wall at one end and one side, there being a door opening at the other end and a door opening in the side wall adjacent to the end wall, separate doors for closing the respective openings, a squeeze extending upwardly from and mounted to swing relative to the floor, said squeeze being disposed oppositely to and spaced from the side wall, means adjacent to the side wall for actuating the squeeze to hold an animal firmly against the side wall and the door thereof, there being a space above the end wall for the reception of the neck and head of the held animal, a detachable grid in the side door opening above the side door mounted for up and down sliding movement and for outward swinging movement, and separate means for holding the grid at either limit of its swinging movement.

2. A branding chute comprising a structure having a side and end wall, there being a door opening at the other end of the chute and in the side wall respectively, doors movable to position across the respective openings, a grid detachably mounted within the door opening above the side door and mounted for up and down sliding movement and for lateral swinging movement relative to the door, means for holding the grid against swinging movement when in its extreme lower position, said grid being slidable upwardly for disengagement from the holding means, and means carried by the structure for supporting the grid at the upper limit of its swinging movement.

ARTHUR C. HUCKELBRIDGE.